June 23, 1936.  R. DEBENEDETTI  2,045,540
MANUFACTURE OF FLEXIBLE TUBES
Filed May 11, 1933
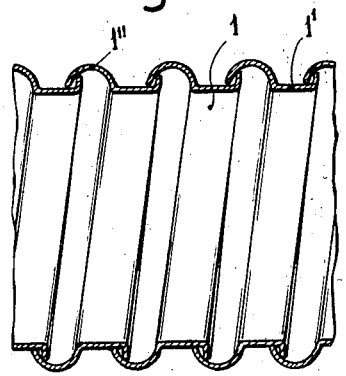
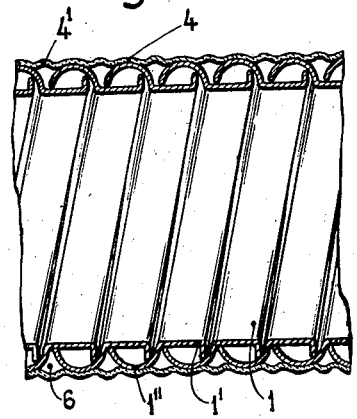
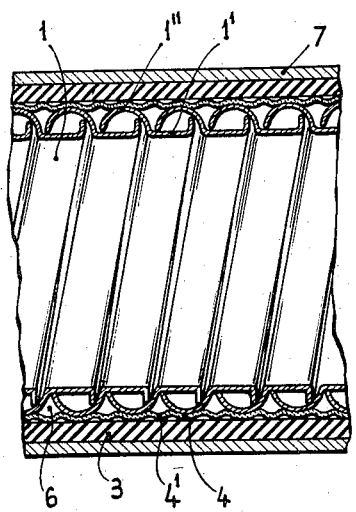
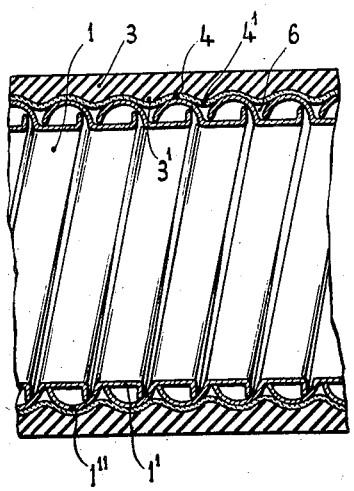

Patented June 23, 1936

2,045,540

UNITED STATES PATENT OFFICE 2,045,540

MANUFACTURE OF FLEXIBLE TUBES

Rodolfo Debenedetti, Turin, Italy, assignor to Chicago Tubing & Braiding Company, Chicago, Ill.

Application May 11, 1933, Serial No. 670,589
In Italy May 25, 1932

12 Claims. (Cl. 154—8)

This invention relates to the manufacture of flexible metal tubes of the kind having an outer rubber coating and including a protecting continuous layer intermediate the continuous metal body of said tube and said rubber coating, such layer consisting of a derivative of cellulose, of the kind disclosed in my copending application filed February 25, 1931, Ser. No. 518,209.

As known, said composite flexible metal tubes are particularly useful in handling and conveying fluids, as gasoline and the like, capable of affecting rubber and equivalent materials.

It is known that flexible films may be obtained from derivatives of cellulose, such as regenerated cellulose which is particularly useful to provide said protecting layer, but such films have an inextensible character.

Therefore, when materials of the above class are used to provide a protecting layer intended to prevent any fluid which could leak through the coils of the metal tube body from reaching and attacking the outer rubber coating in tubes of the above defined class, said layer must be provided with transverse corrugations to allow elongation when the composite tube is bent.

In the embodiment disclosed in my copending application hereinbefore referred to, said corrugations are obtained by means of a cord which is coiled and tightened over said layer located on the metal body of the tube, to cause it to enter the helicoidal groove existing between adjacent coils providing said metal body of the tube.

The present invention has for its object an improved method for producing in the protecting layer located intermediate the metal body of the tube and its outer rubber coating, a helicoidal groove having a sufficient depth for the purpose intended, without the sheet providing said layer being required to move or slide over or along said metal body during the formation of said groove.

The method of this invention is hereinafter described with reference to the annexed drawing where the steps of the operation are illustrated and Figure 1 is a central fragmentary section of a length of a blank of tube preparatory to location of the protecting layer thereon;

Figure 2 is a section similar to Fig. 1 in the step subsequent to the location of protective layer over the tube metal body;

Figure 3 is a fragmentary section of a length of tube having an outer rubber coating affixed thereon preparatory to the step of vulcanizing the same;

Figure 4 is a section similar to Figure 3 of the completed tube.

In carrying out the method of this invention, an internal metal body is prepared in usual manner by wrapping helicoidally a reverse channel metal strip 1 to provide adjacent coils having interengaged edges as 1' and 1"; said channel metal strip has conveniently a rounded cross section in its outwardly extending portion as illustrated at 1".

To provide the impervious protecting layer above referred to, one or more bands 4 consisting of a film of cellulosic material are wound or wrapped over body 1, while this body 1 is held stretched or elongated in the condition shown in Figure 1, that is having the side flanges or edges 1', 1" of subsequent coils in contact with each other.

Said bands 4 then provide a cylindrical tube which bears on said body 1 only in register with the most prominent portions 1" of each coil of said body 1.

The body 1 is then caused to contract or collapse longitudinally or endwise in any suitable manner, say by locating it on a core or mandrel not shown and by causing its ends to approach each other, the adjacent coils being thus caused to again take up their normal position and overlap as shown in Figure 2.

Due to such endwise collapse of metal body 1, said layer 4 of cellulose derivative is caused to fold and pleat in the region 4' of the same included between the lines of its contact with prominent portions 1" of body 1, as shown in Figure 2. Said pleating of sheath 4 occurs due to the fact that such sheath is soft in view both of the material it is made of and of its small thickness and also due to the fact that owing to its support on enlarged portions 1" of the metal tube 1 said sheath adheres to this tube in register with such portions 1".

Therefore said sheath while being smooth and even at the time the metal reinforcement tube 1 is stretched, collapses and provides pleats when said tube is allowed to collapse.

Of course, as described in my said copending application, a cord (not shown) may be wound over layer 4 in the region of pleats 4' to cause such pleats to enter the helicoidal groove 6 between coils of body 1.

The tube is then completed by affixing a coating 3 of uncured or not vulcanized rubber which is then enclosed within an outer envelope 7, and finally the composite structure is heated to cure and vulcanize said rubber coating 3.

Due to such treatment, the rubber of coating 3 swells out and owing to the envelope 7 confining it outwardly, its swelling or expansion may develop or operate only inwardly of the tube, that is towards the tube axis, the layer 4 being thus forced and tightened over the projecting portions 1" of body 1, while the portions 4' of layer 4 intermediate the tops 1" of coils, that is in register with the depression or groove 6 of body 1, are caused to enter the same (Figure 4).

The tube thus completed is finally released from envelope 7.

In the completed tube, as shown in Figure 4, the layer 4 is thus provided with a continuous helicoidally grooved or depressed portion 4' which is supported from outside by a comparatively soft internal ridge 3' of rubber coating 3, the corrugated portions of said layer being thus enabled to follow the bending or flexure of the tube without being subject to a harmful stretching.

The particular contour of channel metal strip availed of to provide body 1 has the advantage that layer 4 never may contact with sharp edges of such metal body and therefore it cannot be torn off during the manufacture of the tube nor due to movements the protecting layer 4 may effect with respect to the internal metal body or core of the tube.

What I claim as my invention and desire to secure by United States Letters Patent is:—

1. A method for manufacturing flexible metal tubes having a core consisting of a coiled sheet metal strip, an impervious layer on said core and an outer coating of a material of the class of rubber, comprising stretching said core longitudinally, locating said layer thereon, collapsing said core longitudinally to cause said layer to pleat in register at the region of overlap of said metal strip forming said core, and then affixing said coating over said layer.

2. A method for manufacturing flexible metal tubes having a core of a coiled channel sheet metal strip, an impervious layer on said core and an outer coating of a material of the class of rubber, comprising stretching said core longitudinally, locating said layer thereon, collapsing said core longitudinally to produce a groove therein in register with the interengaged adjacent portions of said channel metal strip and to cause said layer to pleat in register with such groove, and then affixing said coating on said layer.

3. A method for manufacturing flexible metal tubes having a core of a coiled reverse channel shaped sheet metal strip, an impervious layer on said core and an outer coating of a material of the class of rubber, comprising stretching said core longitudinally, locating said layer thereon, collapsing said core longitudinally to produce a groove therein in register with the interengaged adjacent portions of said channel metal strip and to cause said layer to pleat in register with such groove, and then affixing said coating on said layer.

4. A method for manufacturing flexible metal tubes having a core of a coiled sheet metal strip, an impervious layer on said core and an outer coating of a material of the class of rubber, comprising stretching said core longitudinally, locating said layer thereon, collapsing said core longitudinally to cause said layer to pleat in register in the region of overlap of said metal strip forming said core, affixing said rubber material coating in an unvulcanized state over said layer and then vulcanizing it thereon.

5. A method for manufacturing flexible metal tubes having a core of a coiled channel sheet metal strip, an impervious layer on said core and an outer coating of a material of the class of rubber, comprising stretching said core longitudinally, locating said layer thereon, collapsing said core longitudinally to produce a groove therein in register with the interengaged adjacent portions of said channel metal strip and to cause said layer to pleat in register with such groove, affixing said rubber-material coating in an unvulcanized state over said layer, enclosing the whole in an envelope and vulcanizing said coating therein, the portions of said coating in register with said groove which swell out due to said vulcanization forcing said layer pleats into said groove and yieldably backing them.

6. A method for manufacturing flexible metal tubes having a core of a coiled reverse channel shaped sheet metal strip, an impervious layer on said core and an outer coating of a material of the class of rubber, comprising stretching said core longitudinally, locating said layer thereon, collapsing said core longitudinally to produce a groove therein in register with the interengaged adjacent portions of said channel metal strip and to cause said layer to pleat in register with such groove, affixing said rubber-material coating in an unvulcanized state over said layer, enclosing the whole in an envelope and vulcanizing said coating therein, the portions of said coating in register with said groove which swell out due to said vulcanization forcing said layer pleats into said groove and yieldably backing them.

7. A method for manufacturing flexible metal tubes having a coiled sheet metal strip core, an impervious layer on said core and an outer coating of the class of the rubber, comprising coiling helicoidally a reverse channel shaped metal strip comprising a flat channel portion opening outwardly and a rounded channel portion opening inwardly and providing a rounded ridge on the outside of said core, stretching said core longitudinally, locating said layer thereon, collapsing said core longitudinally to produce a groove therein in register with said interengaged adjacent channel portions and to cause said layer to pleat in register with said groove, affixing said rubber-material coating in an unvulcanized state over said layer, enclosing the whole in an envelope and vulcanizing said coating therein, the portions of said coating in register with said groove which swell out due to said vulcanization forcing said layer pleats into said groove and yieldably backing them.

8. A method of manufacturing a flexible metal tube having a flexible core and an impervious layer on said core including the steps of stretching said core longitudinally, then placing said impervious layer thereon and then collapsing said core longitudinally to produce corrugations in said impervious layer.

9. A method of manufacturing a flexible metal tube comprising coiling a reverse channel-shaped metal strip helicoidally so as to form an extensible core, then stretching said core longitudinally, then applying an impervious layer upon said core when in stretched condition and then collapsing said core so as to form corrugations in said impervious layer.

10. A method of manufacturing a flexible metal tube comprising forming an extensible metal core, then extending said core longitudinally, then applying to said core an impervious non-extensible layer of material and then collapsing said core so as to form pleats in said impervious non-extensible layer.

11. A method of manufacturing a flexible metal tube comprising forming an extensible metal core, then extending said core longitudinally, then applying to said core an impervious non-extensible layer of material, then collapsing said core so as to form pleats in said impervious non-extensible layer and then vulcanizing about said impervious non-extensible layer a rubber coating.

12. A method of manufacturing a flexible metal tube having a flexible core and an impervious layer on said core including the steps of stretching said core longitudinally, then placing said impervious layer thereon, then collapsing said core longitudinally to produce corrugations in said impervious layer and then forcing said corrugations into a groove upon said flexible core.

RODOLFO DEBENEDETTI.